No. 788,317. PATENTED APR. 25, 1905.
W. L. JUDSON.
SEPARABLE FASTENER.
APPLICATION FILED AUG. 26, 1904.
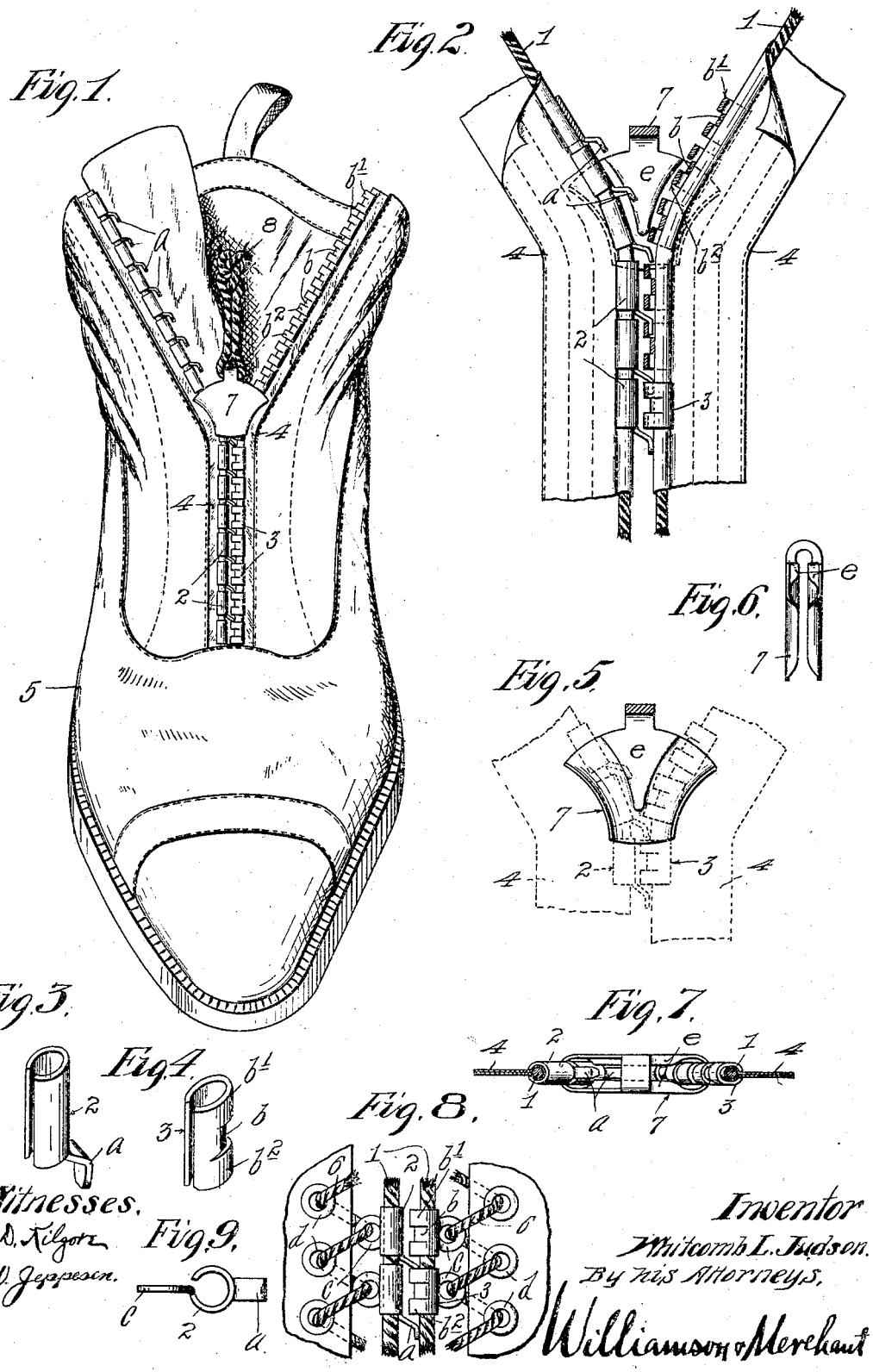

No. 788,317.                                              Patented April 25, 1905.

UNITED STATES PATENT OFFICE.

WHITCOMB L. JUDSON, OF CHICAGO, ILLINOIS, ASSIGNOR TO THE UNIVERSAL FASTENER COMPANY, OF CHICAGO, ILLINOIS, A CORPORATION OF ILLINOIS.

SEPARABLE FASTENER.

SPECIFICATION forming part of Letters Patent No. 788,317, dated April 25, 1905.

Application filed August 26, 1904. Serial No. 222,237.

*To all whom it may concern:*

Be it known that I, WHITCOMB L. JUDSON, a citizen of the United States, residing at Chicago, in the county of Cook and State of Illinois, have invented certain new and useful Improvements in Separable Fasteners; and I do hereby declare the following to be a full, clear, and exact description of the invention, such as will enable others skilled in the art to which it appertains to make and use the same.

My invention relates to separable fasteners for shoes and other similar purposes of the general type disclosed in my two prior patents, No. 557,207 and No. 557,208, of date March 31, 1896, and has for its object to provide certain improvements therein with a view of greater economy in manufacture and greater efficiency in service.

To this end my invention consists of the novel devices and combinations of devices hereinafter described, and defined in the claims.

My invention is illustrated in the accompanying drawings, wherein like notations refer to like parts throughout the several views.

In said drawings, Figure 1 is a view in perspective showing my improved fastener as applied to a shoe. Fig. 2 is a detail, on enlarged scale, with some parts broken away and others shown in section, illustrating a portion of the fastener shown in Fig. 1. Fig. 3 is a detail showing one of the male links of one of the chains in perspective. Fig. 4 is a similar view showing one of the female links of one of the chains. Fig. 5 is a view, partly in section and partly in plan, with some portions shown in diagram, illustrating the construction and action and of the cam-action slider or locker and unlocker which is used to couple together the parallel chains and may be used to uncouple the same. Fig. 6 is an edge view of said slider detached. Fig. 7 is a view of the said slider in plan, looking down on the large end of the same when in working position, as shown in Fig. 1. Fig. 8 is a view showing a modification wherein the links of the two chains are slightly modified in construction and the chains are secured to the flaps of the shoes or other body by lacing-cords; and Fig. 9 is a detail in end plan, showing one of the links of Fig. 8 detached.

The numeral 1 represents a pair of continuous flexible stringers to which the links of the chain are attached and by which the same are separably and flexibly supported.

The numeral 2 represents the male links, and the numeral 3 the female links, of the chains. All the male links 2 are secured to one of the stringers 1, and all the female links 3 are secured to the other stringer. These links 2 and 3 are composed of short compressible metallic split tubes or tubular-like clips adapted to receive the stringers 1 sidewise through the split openings thereof and to be tightly clamped to the said stringers by compression of the lip portions of the clips or that portion of the clips directly adjacent to the split openings therein. Each male link 2 is provided at its lower end with a hook-like projection $a$. Each female link is of less diameter in cross-section in the plane of the split at the central portion of the link than at the opposite ends thereof, this construction affording a central or body portion $b$, which is reduced in one plane of cross-section as compared with the end portions $b'$ and $b^2$. The end portions $b'$ and $b^2$ therefore constitute projecting lugs the upper member $b'$ of which serves as an eye to receive and interlock with the hook $a$ of the male link 2 and the lower member $b^2$ of which lugs serves as a lap-lug which when the parts are in working position overlaps the hook of the last-coupled pair of links and holds the same in their coupled or locked position. All the male links 2 are located on one of the stringers and all the female links on the other stringer, and the coupling members or links of the two opposing chains are slightly staggered in a longitudinal direction in respect to each other, as best shown in Figs. 2 and 8. The stringers 1 are shown as in the form of hard cords; but it will be understood that the same might be composed of other suitable flexible material capable of holding the metallic clips when clamped thereto. Experience has demonstrated that the hard cords constitute the best available material for the stringers. As shown in Figs. 1 and 2, the said stringers 1 are secured in the marginal hem of the flap portions 4 of the shoe 5, and when so applied the said stringers constitute a part of the flap of the shoe before the chain-links are applied thereto.

In the modification shown in Figs. 8 and 9 both the male and female links 2 and 3 of the chains are provided at their backs with eye-lugs $c$, through which and corresponding eyelets $d$ in the flaps 4 are passed ordinary lacing-strings 6 for connecting the parallel coupling-chains to the flaps of the shoe or other body.

Assuming the links to have been properly secured to the stringers 1 and these to be a part of or secured to the flaps which are to be separably united—as shown, for example, in Figs. 1, 2, and 8—it is of course obvious that the two chains will be parallel to each other and the male and female coupling members of the two chains will be directly opposite to each other, and, further, that their interlocking parts may be made to engage with each other by a pivotal movement of the coöperating or coupling links in a certain predetermined order—to wit, beginning at the foot or lowermost pair and continuing in regular order to the head member or pair of coupling parts on the two chains. It is equally obvious that when the two parallel chains have thus been coupled together throughout their entire length they may be uncoupled under an instantaneous action by pulling apart the head ends of the two chains. It is further true that when coupled together throughout the entire length of the chains the coupled parts will remain locked together against strain in every direction, except uncoupling strain in the reverse order of the coupling action, beginning from the head members downward.

So far the action has been described as if the two chains were coupled by hand, as well as uncoupled by hand, and this can be done; but one great advantage of this form of fastener is that the two chains can be coupled throughout their entire length by an almost instantaneous action with the use of the cam-action slider 7. This slider 7 is similar in the principle of its construction to the so-called "locker" and "unlocker" disclosed in my prior patents, No. 504,038, of date August 29, 1893, and No. 557,207, of date March 31, 1896, and any extended detail description thereof is not thought necessary for the purposes of this case. It is sufficient to state that said slider 7 is substantially of triangular form in outline and is provided with a pair of cam-channels which converge and meet into a common channel directly below the point of a dividing triangular block $e$, secured between the top and bottom plate of the slider, as best shown in Figs. 2 and 5. With this form of slider the two chains are entered in the common cam-channel and pass out through the diverging channels, as clearly shown in the drawings, and hence it follows that if the slider be at the lowermost point of its travel lengthwise of the two chains the same will be uncoupled throughout their entire length, unless it be the lowermost pair of coupling-links thereon, and, further, that if the slider then be pulled upward all the coupling-links will receive the required pivotal motion in respect to each other for engaging their interlocking parts and holding the same in their coupled or locked position. The slider is shown as provided with a finger-pull 8 for moving the same into its uppermost position. Suitable stops of any kind may be provided at the head ends of the two chains to prevent the slider from being pulled off from the chains. The slider works on the chains with sufficient friction to remain in whatever position it may be set, and in practice if this is found insufficient a retaining-detent of any suitable form may be provided to hold the slider at the head end of the chain.

As before intimated, the slider may be used also to uncouple the chains by forcing the same back downward or in reverse order of its coupling travel; but it is not necessary to so manipulate the slider. Assuming the slider to be unlocked from any retaining-detent and the head ends of the chains to be free from each other, it is only necessary to take hold of the same or the flaps to which they are attached and pull the same apart from each other, when the two chains will be uncoupled throughout their entire length under an instantaneous action and be separated much like two pieces of paper might be torn apart from each other on a perforated line, and in this action of pulling the chains apart the slider will automatically move downward on the chains to the lowermost limits of its travel. It must be obvious, therefore, that this fastener is one of great efficiency and convenience for connecting the flaps of shoes, gloves, leggings, corsets, or of any other bodies having flexible margins which need to be separably united, such as mail-bags and many others.

As compared with the structures disclosed in my said prior patents the construction herein disclosed affords a pair of chains which are less bulky and more flexible and are easier and cheaper to make.

This fastener may be applied to the flaps which are to be separably connected either directly, as shown in Figs. 1 and 2, or indirectly, as shown in Figs. 8 and 9. For shoes it is in some respects more desirable to employ the indirect connection by lacing-strings 6, as shown in Fig. 8, for the reason that this affords a means of adjusting the chains or fastener to the set of the shoe on the foot and for changing the same from time to time, as may be required, to secure the best set or fit of the shoe to the foot. The lacing-strings, of course, having been once adjusted are permanently secured until a new adjustment is required.

By actual usage the efficiency of this fastener for the purposes had in view has been fully demonstrated.

What I claim, and desire to secure by Letters Patent of the United States, is as follows:

1. A pair of parallel coupling-chains, composed of a pair of continuous flexible stringers and a series of chain-links secured thereto and flexibly connected thereby, the opposite links of the two chains being provided with interlocking parts, adapting the chains to be coupled together, throughout their entire length, by a pivotal movement of the coupling-links, in a predetermined order of succession, and to be uncoupled, throughout the entire length of the chains, under an instantaneous action, by simply pulling apart the head ends of the chains, substantially as described.

2. The combination with a pair of continuous flexible stringers, of a series of chain-links composed of compressible tubes or clips, clamped to said stringers, and coöperating therewith, to form a pair of parallel chains the links of which are flexibly connected together, and the opposite links of which two chains are provided with interlocking parts, adapting said chains to be coupled together throughout their entire length, and to be uncoupled throughout their entire length, under an instantaneous action, by pulling apart the head ends of the chains, substantially as described.

3. The combination with a pair of continuous flexible stringers, of a series of chain-links composed of compressible split tubes or clips, adapted to receive said stringers sidewise, through the split openings of the tubes or clips, and to be clamped fast thereto, the opposite links of which chains are provided with interlocking parts, adapting the chains to be coupled together throughout their entire length, and to be uncoupled, under an instantaneous action, by pulling apart the head ends of the chains, substantially as described.

4. The combination with a pair of continuous flexible stringers, of two series of chain-links having respectively male and female interlocking parts, the mail links being clamped to one stringer, and having at their lower ends hook-like projections, and the female links being clamped to the other stringer, and having at their upper ends projecting eye-lugs, adapted to be engaged by the hooks of said male members, and having at their lower ends projecting lap-lugs, adapted to overlap the hooks of the last previously-coupled pair of links, substantially as and for the purposes set forth.

5. The combination with the pair of parallel coupling-chains composed of the continuous flexible stringers and the series of chain-links secured thereto and flexibly connected thereby, the opposite links of which two chains have interlocking or coupling parts, of the cam-action slider having the pair of cam-channels which converge into single channel at one end of the slider, below a triangular dividing-block, and diverge in the opposite direction, along the sides of said block, to the points of delivery at the opposite ends of the slider, and which slider works on the said chains under sufficient friction to remain in any position in which it may be set, substantially as and for the purposes set forth.

6. The combination with a pair of continuous flexible hard-cord stringers, of a series of chain-links composed of compressible tubes or clips, clamped to said stringers, and coöperating therewith to form a pair of parallel chains, the links of which are flexibly connected together, and the opposite links of which two chains are provided with interlocking parts, adapting said chains to be coupled throughout their entire length, under an instantaneous action, by pulling apart the head ends of the chains, substantially as described.

In testimony whereof I affix my signature in presence of two witnesses.

WHITCOMB L. JUDSON.

Witnesses:
MARY SIMMS,
G. E. CLARK.